US006996216B2

(12) United States Patent
Brown et al.

(10) Patent No.: US 6,996,216 B2
(45) Date of Patent: Feb. 7, 2006

(54) COMPENSATING RECIPIENTS OF CALLS

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 590 days.

(21) Appl. No.: 10/022,159

(22) Filed: Dec. 17, 2001

(65) Prior Publication Data
US 2003/0115070 A1 Jun. 19, 2003

(51) Int. Cl.
*H04M 15/00* (2006.01)

(52) U.S. Cl. ............................. 379/114.01; 379/114.1; 379/114.21; 705/67; 705/405

(58) Field of Classification Search .................... 705/1, 705/26, 64, 67, 400; 455/405, 406; 370/352; 379/114.01, 114.21, 114.22, 114.23, 114.25, 379/114.24, 114.1
See application file for complete search history.

(56) References Cited

U.S. PATENT DOCUMENTS

| 5,148,474 A | * | 9/1992 | Haralambopoulos et al. ................... 379/114.25 |
| 5,206,899 A | | 4/1993 | Gupta et al. ................. 379/120 |
| 5,381,467 A | | 1/1995 | Rosinski et al. ........ 379/121.01 |
| 5,499,288 A | | 3/1996 | Hunt et al. |
| 5,537,464 A | * | 7/1996 | Lewis et al. ............ 379/114.25 |
| 5,568,541 A | * | 10/1996 | Greene ................... 379/114.25 |
| 5,602,907 A | | 2/1997 | Hata et al. .............. 379/114.22 |
| 5,673,404 A | | 9/1997 | Cousins et al. |
| 5,754,663 A | | 5/1998 | Goldfarb ................ 379/114.21 |
| 5,790,637 A | | 8/1998 | Johnson et al. |
| 5,805,680 A | | 9/1998 | Penzias ....................... 379/118 |
| 5,822,411 A | | 10/1998 | Swale et al. ............ 379/114.22 |
| 5,859,900 A | | 1/1999 | Bauer et al. ............ 379/114.21 |
| 5,872,834 A | | 2/1999 | Teitelbaum .............. 379/93.03 |
| 5,915,001 A | | 6/1999 | Uppaluru |
| 5,937,044 A | | 8/1999 | Kim |
| 5,940,476 A | | 8/1999 | Morganstein et al. |
| 5,943,405 A | | 8/1999 | Morikawa et al. ........... 379/118 |
| 5,946,654 A | | 8/1999 | Newman et al. |
| 5,978,450 A | | 11/1999 | McAllister et al. ....... 379/88.02 |
| 5,978,775 A | * | 11/1999 | Chen ........................... 705/26 |
| 6,038,305 A | | 3/2000 | McAllister et al. |

(Continued)

FOREIGN PATENT DOCUMENTS

EP 0585004 A2 3/1994

(Continued)

OTHER PUBLICATIONS

"VoIP Gateways:Bigger and Better", Business Communications Review, vol. 31, No. 9, vol. 56(7) (Sep. 2001).*

(Continued)

*Primary Examiner*—Salvatore Cangialosi
(74) *Attorney, Agent, or Firm*—Mark S. Walker; Amy J. Pattillo

(57) ABSTRACT

A method, system, and program for compensating recipients of calls are provided. A request to bill a caller a tariff for a call is initiated, wherein the caller originates the call. The caller is prompted to accept payment of the tariff to receive access to a destination line during the call. Responsive to negotiating for the payment of the tariff from the caller, the caller is connected with the destination line, such that the caller pays for access to the destination line. In particular, the caller may pay for access to a particular callee at the destination line.

37 Claims, 7 Drawing Sheets

U.S. PATENT DOCUMENTS

| | | | |
|---|---|---|---|
| 6,047,051 A | 4/2000 | Ginzboorg et al. | 379/130 |
| 6,058,364 A | 5/2000 | Goldberg et al. | |
| 6,101,242 A | 8/2000 | McAllister et al. | 379/88.02 |
| 6,122,357 A | 9/2000 | Farris et al. | 379/207 |
| 6,144,723 A * | 11/2000 | Truchon et al. | 379/114.01 |
| 6,178,230 B1 | 1/2001 | Borland | 379/67.1 |
| 6,195,419 B1 | 2/2001 | Gilboy | 379/114.26 |
| 6,253,069 B1 * | 6/2001 | Mankovitz | 455/186.1 |
| 6,282,274 B1 | 8/2001 | Jain et al. | 379/114.26 |
| 6,324,269 B1 | 11/2001 | Malik | 379/114.23 |
| 6,327,346 B1 | 12/2001 | Infosino | 379/88.02 |
| 6,330,315 B1 * | 12/2001 | Kapsales et al. | 379/114.24 |
| 6,381,317 B1 | 4/2002 | Bala et al. | 379/114.23 |
| 6,459,902 B1 * | 10/2002 | Li et al. | 455/405 |
| 6,493,438 B1 * | 12/2002 | Gross et al. | 379/114.22 |
| 6,504,918 B1 * | 1/2003 | Herling | 379/114.21 |
| 6,529,726 B1 * | 3/2003 | Rhodes | 455/406 |
| 6,542,590 B1 | 4/2003 | Player et al. | |
| 6,546,238 B1 * | 4/2003 | Nightingale et al. | 379/114.23 |
| 6,603,843 B1 | 8/2003 | Hagemann | 379/111 |
| 6,636,504 B1 * | 10/2003 | Albers et al. | 370/352 |
| 6,639,977 B1 | 10/2003 | Swope et al. | 379/114.21 |
| 6,826,173 B1 | 11/2004 | Kung et al. | |
| 2002/0099670 A1 * | 7/2002 | Jakobsson | 705/400 |
| 2003/0108158 A1 | 6/2003 | Brown et al. | 379/88.01 |
| 2003/0108159 A1 | 6/2003 | Brown et al. | 379/88.01 |
| 2003/0108160 A1 | 6/2003 | Brown et al. | 379/88.01 |
| 2003/0108161 A1 | 6/2003 | Brown et al. | 379/88.01 |
| 2003/0108163 A1 | 6/2003 | Brown et al. | 379/88.01 |
| 2003/0112935 A1 | 6/2003 | Brown et al. | 379/114.21 |
| 2003/0112936 A1 | 6/2003 | Brown et al. | 379/121.02 |
| 2003/0114142 A1 | 6/2003 | Brown et al. | 455/408 |
| 2003/0115138 A1 | 6/2003 | Brown et al. | 705/40 |
| 2003/0115139 A1 | 6/2003 | Brown et al. | 455/408 |

FOREIGN PATENT DOCUMENTS

| | | |
|---|---|---|
| JP | 0676882 A2 | 10/1995 |
| JP | 8139797 A | 5/1996 |
| JP | 10294784 A | 11/1998 |

OTHER PUBLICATIONS

WPAT Derwent 1994-067503.
WPAT Derwent 1995-346415.
WPAT Derwent 1996-315499.
WPAT Derwent 1999-031530.

* cited by examiner

COMPENSATING RECIPIENTS OF CALLS

BACKGROUND OF THE INVENTION

1. Technical Field

The present invention relates in general to telecommunications and, in particular, to voice identification. Still more particularly, the present invention relates to originating a billed transaction at a destination telephony device.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

Today, the public switching telephone network (PSTN), wireless networks, and private networks telephone services are based on the identification of the wireless telephone or wireline that a calling party uses. Services are personalized according to wireless telephone or wireline telephone number, where services associated with one telephone number are not accessible for another telephone number assigned to the same subscriber. For example, there is typically a first set of service features and billing options assigned to a home line number, a second set of service features and billing options assigned to an office line number, and a third set of service features and billing options assigned to a cellular telephone number. The networks process calls to and from each of these different subscriber telephones based on a separate telephone number.

Many of the services provided by telephone switching systems are implemented in order to reduce or alleviate the effects of telemarketers and other unwanted callers. For example, one service available from most telephone service providers is caller ID. Caller ID provides the name of a line subscriber and the line number from which a call originates to the telephony device receiving the call. Thus, an individual receiving a call is able to determine, before answering the call, the line number from which a call originates.

However, caller ID has a side effect of allowing others to capture the same individual's line number and pass the line number along to a telemarketing call list. Therefore, an additional service allows the line subscriber to block caller ID from being sent when a call originates from the line number, such that call recipients only receive a signal that caller ID is blocked for the line number. However, telemarketers may also block caller ID for telemarketer based line numbers, thus defeating the original purpose of caller ID.

An additional annoyance is created when telemarketers call a wireless telephone. The recipient then wastes valuable minutes to answer the call and decline the telemarkter's offer. Further, telemarketers often interrupt a household during valuable family time.

Therefore, in view of the foregoing, it would be advantageous to provide a method, system, and program for requiring callers to compensate call recipients for their time. In particular, it would be advantageous to originate a billed transaction to a caller from the device receiving a call. In addition, it would be advantageous to vary the compensation required for call recipients according to the time of day or other variables. Further, it would be advantageous to impose a premium on calls with blocked caller ID in order to deter telemarketers and other unwanted callers.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for originating a billed transaction at an origin telephony device.

According to one aspect of the present invention, a request to bill a caller a tariff for a call is initiated, wherein the caller originates the call. The caller is prompted to accept payment of the tariff to receive access to a destination line during the call. Responsive to negotiating for the payment of the tariff from the caller, the caller is connected with the destination line, such that the caller pays for access to the destination line. In particular, the caller may pay for access to a particular callee at the destination line.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
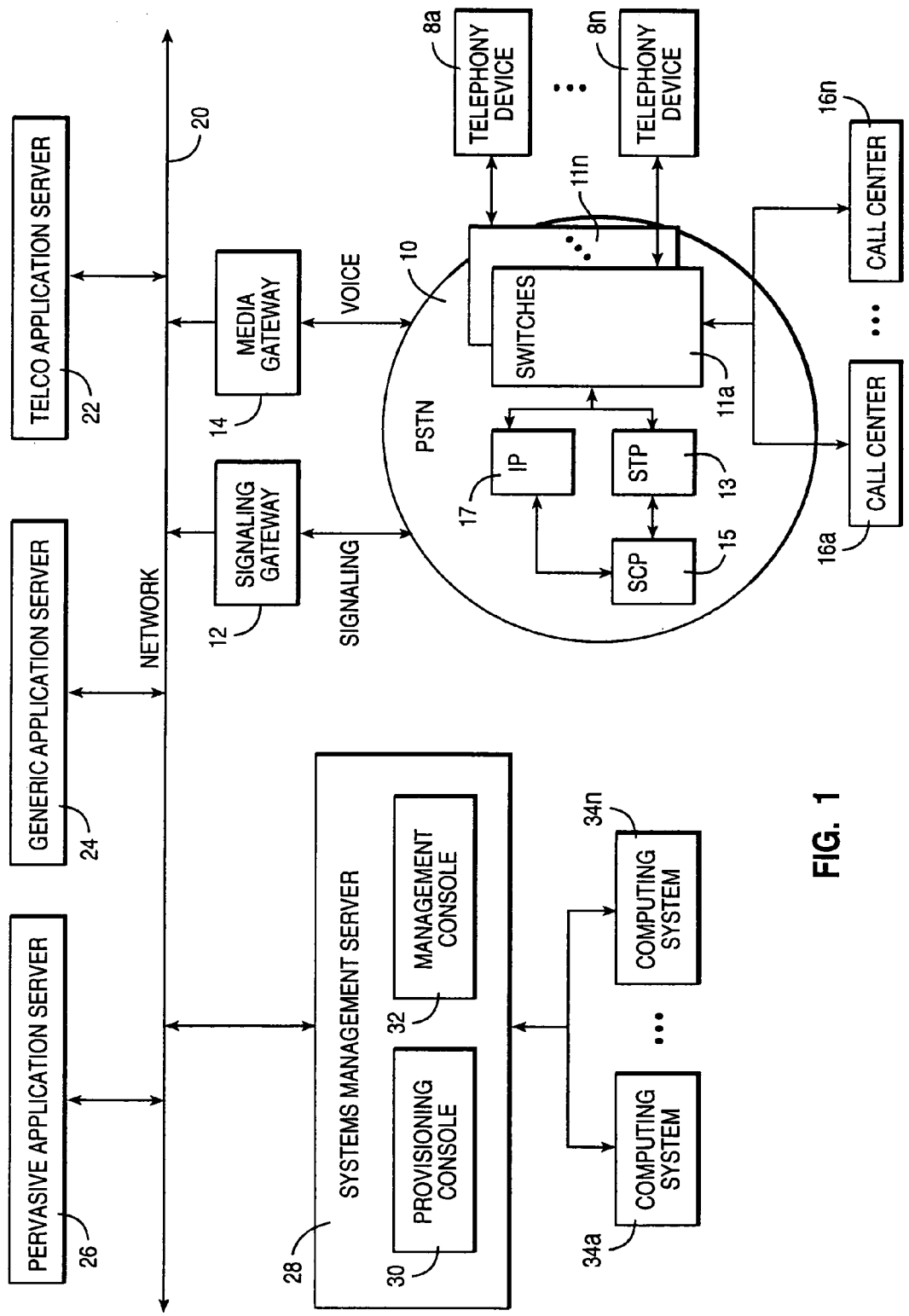
FIG. 1 depicts a block diagram of a network environment in which the present invention may be implemented.

A method, system, and program for compensating recipients of calls are provided. For purposes of the present invention, a billed transaction is initiated for the recipient of a call. A billed transaction is a negotiated transaction between a caller account and callee account to compensate a callee for answering a call.

First, a caller initiates a call to a callee from an origin device. An intermediary device processing the call requests authentication of the caller utilizing the origin device. Caller identity authentication may be initiated by the origin device originating the call, the intermediary device processing the call, or the destination device receiving the call. Each of the devices may also access a third party or external server to perform the caller identity authentication. Performance of caller identity authentication has different advantages depending on the device initiating the caller identity authentication.

In addition to authenticating the identity of a caller, the context of a call is preferably determined. The context of the call may be determined by accessing a database indicating a type of business participated in by the caller. In addition, the caller may be prompted to provide the context for a call.

The identity of a callee receiving a call may be authenticated in a manner similar to that referenced above. A profile for the callee may be accessed according to the authenticated callee identity. In particular, the profile may indicate preferences for invoking a billed transaction service that determines the context of incoming calls and originates a billed transaction if a call meets set criteria. In addition, a callee, after viewing the caller identity and call context, may initiate the billed transaction service.

The billed transaction service may reside within a trusted telephone network as an Intelligent Peripheral. Alternatively, the billed transaction service may reside outside the trusted telephone network accessible via an external network.

The billed transaction service preferably prompts the caller with the tariff requested by the callee for continuing with the call. The caller may attempt to negotiate with the callee or may accept the amount requested by the callee. Further, the caller may initially make a tariff offer to a callee with the call request. Advantageously, the caller is provided with the identity of the callee, such that the caller is assured that the callee is a recipient preferred by the caller. For example, the caller may not want to pay for the call if the callee is a child, but would want to pay for the call if the callee is an adult.

The billed transaction service may also prompt the caller and callee to indicate the accounts from profile billing plans that are to be utilized in the billed transaction. The billed transaction service then establishes the billed transaction between the caller account and the callee account. Where a flat fee is charged, the billed transaction is completed before the call continues between the caller and the callee. Where a periodic rate is charged, the billed transaction is initiated, the call is continued, and the billed transaction is completed when the call terminates. The billed transaction service may establish a trust relationship with a caller account provider, where the account provider is billed after the call. Alternatively, where no trust relationship is established, the billed transaction service may require a deposit or other showing of an ability to pay a tariff amount.

For purposes of the present invention, a billed transaction involves charging a caller a tariff for access to a callee, separate from any payment the caller may owe a telephone service provider or other billing service for services provided during a call. Thus, the callee preferably receives an economic benefit from accepting calls where the caller is willing to pay to access the callee.

A tariff may include, but is not limited to, a monetary amount, a points amount, electronic coupons, electronic vouchers, and other electronic payments that may be transferred. For example, a wireless service provider may donate minutes to a charity, such that the charity can offer those minutes as a tariff for access to callees. In another example, a tariff may include both a monetary amount and a point amount. Further, a tariff may be offered by a caller and/or requested by a callee.

A callee may select preferences for applying tariffs for calls by initiating a billed transaction. For example, a callee profile may indicate that an anonymous caller identifier received between 6PM and 8AM is automatically charged a tariff to reach the caller. In another example, the callee may indicate preferences to charge callers who the callee has to forward to a particular number to be charged for the forwarding.

However, a callee may also be provided the option to refund part of a billed transaction partially or in full. For example, the callee may refund the tariff charged for an anonymous caller identity if the caller is a friend. In another example, the callee may refund the tariff charged to a telemarketer in return for the callee's willingness to listen to the caller, where the caller has persuaded the callee to participate in a service or purchase a product.

In particular, a caller may accept a tariff with conditions. For example, a caller may accept a tariff that requires the callee to actively participate and complete a survey.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

While in the present invention, authentication of a caller identity and callee identity is described with emphasis placed on voice authentication, other methods of caller identity authentication may also be performed. Voice samples utilized for voice authentication are just one of multiple types of biometric sampling. For example, a caller or callee may locally provide an eye scan, a fingerprint, and other biophysical identifiers that are transmitted within or outside the trusted network to authenticate the identity of the caller or callee. Alternatively, keypad entries, such as a pin code, account number, password, or other secure transaction key may be entered by a caller or callee and utilized to authenticate the identity of the caller or callee.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service provider's telephone network is considered trusted movement within a trusted network because the call remains within the company's telephone network infrastructure. However, calls may be transferred from one service provider's telephone network to another service provider's telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service provider's data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via a network 20 is untrusted and therefore may require verification and additional security. Network 20 may be preferably considered an external network.

In the present invention, network 20 may comprise a private network, an Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. PSTN 10 preferably brokers the connection between the telephony device and telco application server 22. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service provider's data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriber's identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Identity Authentication and Call Control

Looking into PSTN 10, a telephone network typically includes multiple switches, such as central office switches 11*a*–11*n,* that originate, terminate, or tandem calls. Central office switches 11*a*–11*n* utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11*a*–11*n* query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themselves to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11*a*–11*n* may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a caller may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Alternatively, to perform subscriber authentication of audio signals received from callers, PSTN 10 may broker a caller identity authentication service from telco application server 22. In particular, a signaling channel is opened between central office switches 11*a*–11*n* and telco application server 22 via signaling gateway 12. In addition, a voice channel is opened between central office switches 11*a*–11*n* and telco application server 22 via media gateway 14.

Because telco application server 22 is located outside of the trusted network, there may be a time delay associated with establishing a connection to telco application server 22 and authenticating the identity of a caller that is longer than a time delay present where a caller identity is authenticated by IP 17.

In addition, because telco application server 22 is located outside of the trusted network, it is advantageous to establish a level of security for transactions between telco application server 22 and central office switches 11*a*–11*n,* wherein the level of security is suitable for untrusted communications. A level of security may be implemented by by utilizing security based protocols, such as the secure socket layer, and by applying ordinary encryption. In particular, the level of security preferably protects the communication channel between telco application server and PSTN 10 and authenticates the identity of the server from which a caller identity authentication service is accessed. Therefore an additional feature of signaling gateway 12 and media gateway 14 is security verification.

Advantageously, VIDs indicate through text, voice, or video the identity of a caller. For example, a caller's name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15.

In addition, as previously described, caller authentication to determine VIDs and RVIDs may be performed by an external system, such as telco application server 22. The VID or RVID returned from telco application server 22 may be transferred from central office switches 11*a*–11*n* to SCP 15 in order to access a subscriber profile associated with the VID or RVID. Alternatively, the VID or RVID may first transfer to IP 17, where additional verification of the caller identity is performed. For example, IP 17 may control distribution of the VID to the caller, where the caller is prompted to enter a password or additional information. IP 17 may then initiate loading the caller profile into central office switches 11*a*–11*n* if the additional caller input is verifiable for the VID.

An origin telephony device or destination telephony device may also determine a VID and/or RVID for the caller and/or callee of a call. In particular, telephony devices 8a–8n and call centers 16a–16n may function as origin and destination telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriber's line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called party's station or line. The switch terminating a call to a destination will also utilize profile information relating to the destination, for example to forward the call if appropriate, to apply distinctive ringing, etc.

In the present invention, a VID for the caller is preferably determined, for example, by IP 17 or telco application server 22. In addition, a context for the call may be determined by IP 17 or telco application server 22, including accesses to information databases and prompts to the caller to provide context information. The call is transferred from one of central office switches 11a–11n to another of central office switches 11a–11n, to terminate the call to a destination telephony device.

According to one advantage of the present invention, a profile for the line subscriber of the destination line may be accessed from SCP 15 and utilized by IP 17 to determine if the call should ring through to the destination line. In particular, a line subscriber may indicate preferences in a profile that indicate particular types of callers to block according to the call context, the call time, and other preferences. In addition, the line subscriber may indicate billed transaction initiation requirements that require particular callers to agree to pay to access the line number. By allowing a line subscriber to designate such preferences, the line subscriber may reduce the number of calls that ring the line number and may filter the calls to only those callers who are willing to pay to reach the line number. Further, the billed transaction service, which may be incorporated in IP 17 or telco application server 22, is initiated and a billed transaction initiated before the call reaches the callee.

Further, the RVID for the callee may be determined by IP 17 or telco application server 22. A profile for the RVID may be accessed from SCP 15 or other external servers, where the profile includes preferences for blocking some callers and initiating billed transactions for other callers. The RVID may also be transferred to the caller telephony device for output to the caller to verify who the caller is paying to receive the call.

A callee may also initiate a billed transaction service from a telephony device by entering a designated code, such as A976@. A A679@ code may allow an origin device to initiate a billed transaction service. Here, a A976@ code allows a destination device to initiate a billed transaction service. The callee may indicate the rate for the billed transaction and select an account to be credited for answering the call. The billed transaction service may be accessible with IP 17 or telco application server 22.

If the caller accepts the conditions of the billed transaction, then the billed transaction service establishes the transaction. Next, the call is processed from central office switches 11a–11n.

As another alternative to dialed digits from the off-hook line terminal, a caller may utilize a voice calling function of a telephony device for indicating how the call should be routed. For example, a caller may say the name of a preferred callee. The device or IP 17 may determine a person within the caller's calling list that matches the voiced name. The matching person's digits are then utilized to route the call.

VID and RVID Authentication Context

Figure 2:
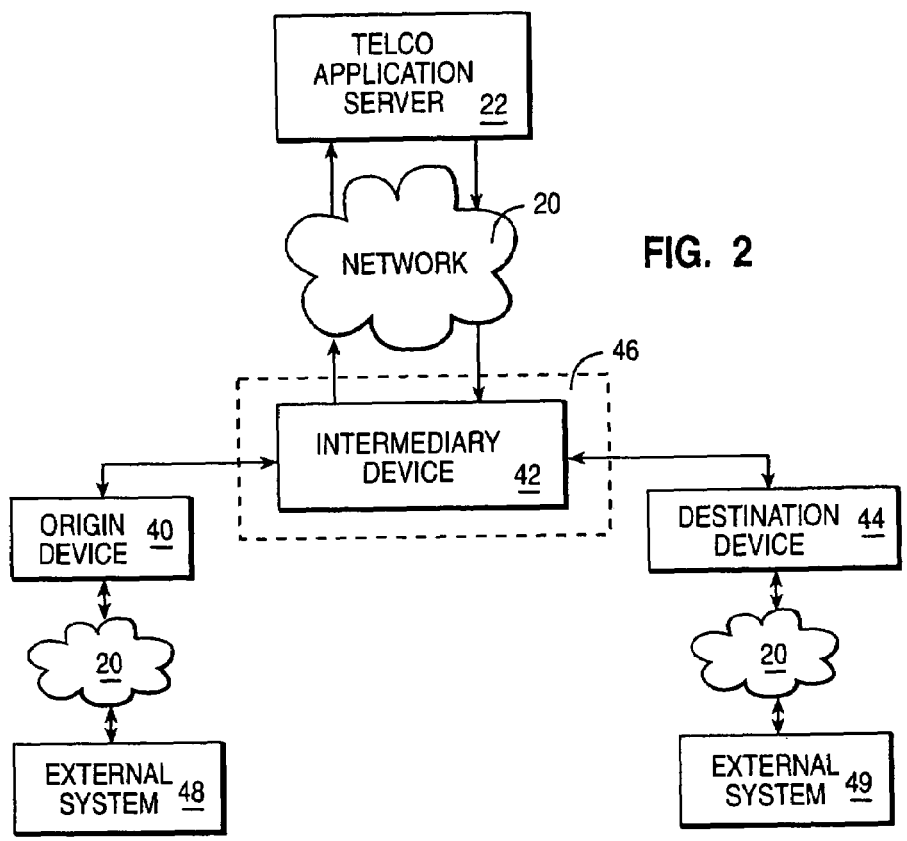
FIG. 2 illustrates a block diagram of the flow of a caller and callee identity authentication in accordance with the method, system, and program of the present invention.

Referring now to FIG. 2, there is illustrated a block diagram of the flow of a caller and callee identity authentication in accordance with the method, system, and program of the present invention.

Origin device 40 is utilized by a caller to initiate a call. The caller is prompted by the device performing caller authentication to provide a voice utterance. A VID for the caller is provided to intermediary device 42 from the device performing caller authentication. The VID is utilized to access a caller profile that includes service preferences and billing information. In addition, the VID is transmitted with the call to destination device 44 for identifying the caller.

In general, caller identity authentication is performed by receiving a voice utterance from a caller, analyzing the voice utterance for sound qualities and content, and attempting to match the sound qualities and content of a voice utterance to a voice template previously recorded for a caller, in order to authenticate the identity of the caller. If there is a match between the voice utterance and a voice template, then a VID is determined for the caller and utilized to authenticate the caller identity for retrieving a caller profile and billing the caller.

In the present invention, the caller may be an individual or a business. In the case of an individual, voice authentication is preferable. However, in the case of a business, where origin device 40 is a private switching system that manages multiple telephony devices, it may be more advantageous for the business to provide a numerical identifier and password or other identification. However, the identity of the actual callers for the business may still be identified by voice authentication. In addition, the private switching system may output a prerecorded voice utterance which may be utilized for VID authentication.

Caller identity authentication may be initiated by origin device 40. In particular, origin device 40 may include voice templates and a feature for performing the caller identity authentication. In addition, origin device 40 may access a third party server 48 via network 20, where third party server 48 may provide access to a database of voice templates and/or perform the caller identity authentication. Origin device 40 then transmits a VID determined for the caller to intermediary device 42 for use in specifying services and billing for a call from origin device 40. Origin device 40 may include a caller telephony device, a PBX, a call center, a private switching system, network servers, feature servers, and other systems which provide call origination. Third party server 48 may include a telco application server, a generic application server, a database management system server, and other systems that function outside trusted telephone network 46. In particular, intermediary device 42 may facilitate communication between origin device 40 and network 20.

In addition, caller identity authentication may be initiated by intermediary device 42. Intermediary device 42 may include database systems that store voice templates and an IP for performing caller identity authentication. In addition, intermediary device 42 may access telco application server 22 outside of trusted telephone network 46 via network 20, where telco application server 22 provides a caller authentication service and/or provides access to a database of voice templates. Intermediary device 42 may include a PSTN switching network or networks. However, intermediary device 42 may also include a PBX, a call center, or other private switching system. Further, intermediary device 42 may include network servers, Websphere® (Websphere® is a registered trademark of International Business Machines Corporation) servers, and other systems which provide call processing.

Further, caller identity authentication may be initiated by destination device 44. Destination device 44 may include voice templates and a feature for performing the caller identity authentication. In addition, destination device 44 may access a third party server 49 via network 20, where third party server 49 may provide access to a database of voice templates and/or perform the caller identity authentication. Destination device 44 will prompt a caller to provide a voice utterance at origin device 40, where intermediary device 42 facilitates communications between origin device 40 and destination device 44. Destination device 44 then determines and transmits a VID for the caller to intermediary device 42 for use in specifying services and billing for a call from origin device 40. Destination device 44 may include a callee telephony device, a PBX, a call center, a private switching system, network servers, feature servers, and other systems which provide call receipt. Third party server 48 may include a telco application server, a generic application server, a database management system server, and other systems that function outside trusted telephone network 46. In particular, intermediary device 42 may also facilitate communication between destination device 44 and network 20.

Destination device 44 is utilized by a callee to receive a call. The callee is prompted by the device performing callee authentication to provide a voice utterance. A RVID for the callee is provided to intermediary device 42 from the device performing callee authentication. The RVID is utilized to access a callee profile that includes service preferences and billing information. In addition, the RVID is transmitted to origin device 40 for identifying the callee. Advantageously, callee identity authentication may be initiated by origin device 40, intermediary device 42, or destination device 44, in a similar process as described for caller identity authentication.

In the present invention, a VID and RVID preferably authenticate the identity of a caller and callee. However, it is advantageous that the VID/RVID also include other information that provide a context for a call. For example, the GPS location or time zone of the caller or callee location, the device from which the call is placed or received, the subject matter of the call, and whether the caller is calling on behalf of another, may be included in a VID or RVID. Further, the identity of the device that performed the identity authentication may be included in a VID or RVID. In addition, the VID and RVID are preferably filtered according to caller and callee profiles, depending on the recipients. A caller may request that an anonymous VID be transferred to a callee.

A VID/RVID may be transferred in multiple protocols, including, but not limited to, Interface Definition Language (IDL). A VID/RVID may include a range of information, where each type of information may be tagged or identified in some other manner. For example, the following tagged VID may be transmitted to represent an authenticated identity of a caller:

[name] Jon Smith
[device] Jane Doe's cell phone
[service provider] Jon's wireless service provider C

Figure 3:
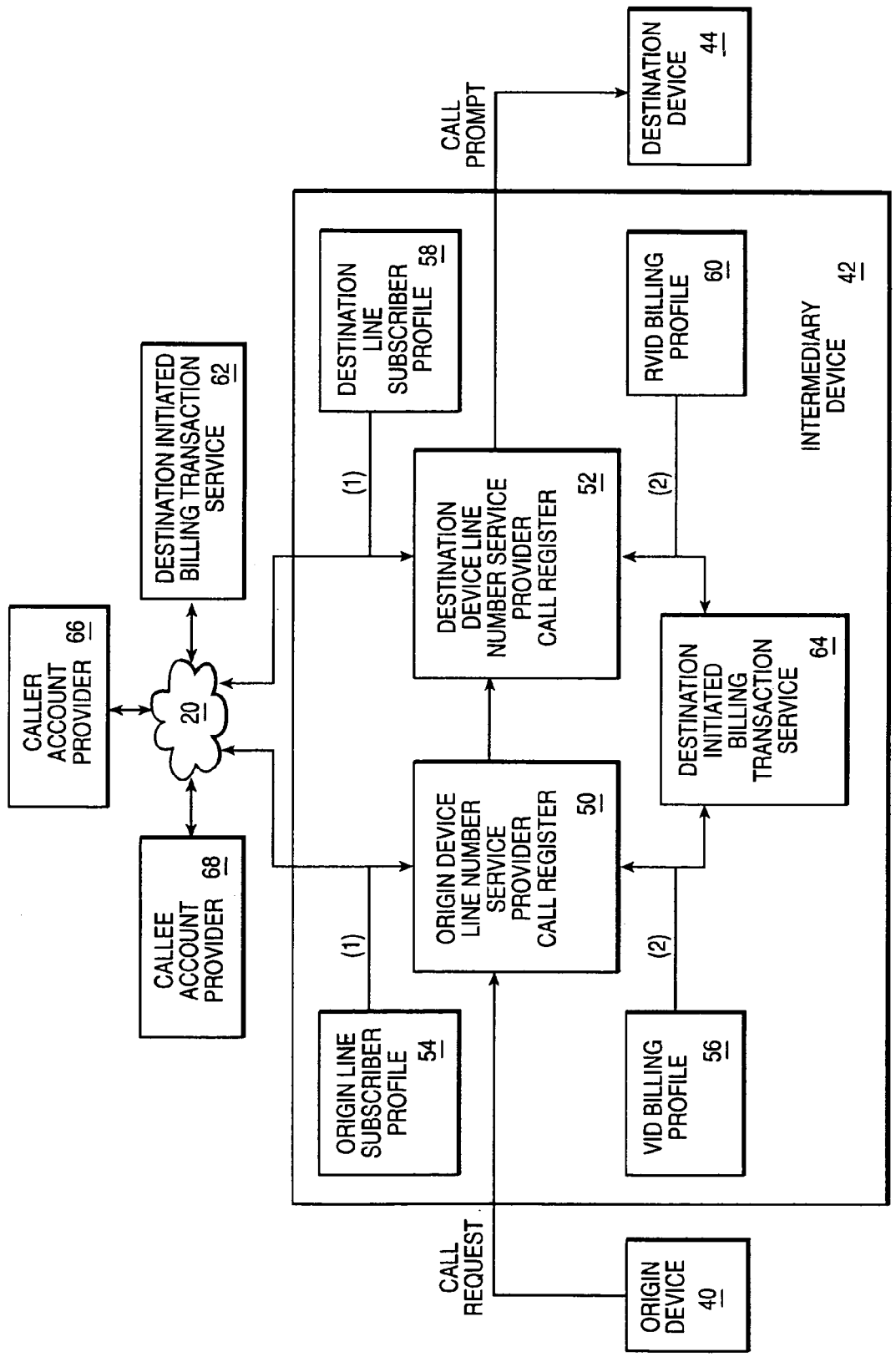
FIG. 3 depicts a block diagram of a network accessing a billed transaction service in accordance with the method, system, and program of the present invention.

[account provider] Jon's credit account provider H
[location] Central Time zone
[subject] Project A
[authenticated by] Jane Doe's cell phone, service provider G Caller Billing Context With reference now to FIG. 3, there is depicted a block diagram of a network accessing a billed transaction service in accordance with the method, system, and program of the present invention. As illustrated, origin device 40 transfers a call request to intermediary device 42. The call request may be an off-hook condition for a wireline device and a network service connection request for a wireless device.

Initially, intermediary device 42 will respond to a call request by establishing a call register 50 for the call. In particular, a service provider that provides a line number accessed by origin device 40 will establish call register 50.

Next, intermediary device 42 will respond by accessing the profile 54 for the subscriber line associated with origin device 40. A dial tone is then extended for the call and authentication of the identity of the caller is performed, as described in FIG. 2.

Once a VID is determined for the call, intermediary device 42 will respond by accessing the profile 56 for the VID. In the example, VID profile 56 includes a VID billing plan of accounts that is accessed and loaded into call register 50. In addition, intermediary device 42 may search for context information for a VID and a line number, including business purposes associated with a VID and a line number. For example, a line number may be associated with a magazine subscription business, where the VID indicates that the caller is an associated named AJon Smith@. Further, the caller may be prompted to provide context information concerning the purpose of a call. For example, Jon Smith may be prompted to provide an input indicating whether the call is a solicitation call or a personal call.

A call register 52 is established to terminate the call to destination device 44. A line subscriber profile 58 associated with the destination device line number is preferably accessed and stored in call register 52. Line subscriber profile 58 preferably includes selections for blocking some VIDs and contexts and initiating billed transactions for other VIDs and contexts. The current VID and context may be compared with the caller selections in line subscriber 58 and the call blocked, forwarded onto the line number, or transferred to a billed transactions service, depending on the line subscriber selections.

In one example, a line subscriber may select a tariff to be applied to any call received at the line number for which the caller ID or VID is blocked. The caller will be prompted by the billed transaction service to either provide an identification or be charged for the call. Therefore, where caller ID blocking allows unwanted callers to ring a line number with anonymity, the present invention requires callers unwilling to provide an authenticated identity to pay for such anonymity.

Further, the line subscriber may select a larger tariff to be applied to any call received at the line number for which the caller ID or VID is blocked between 6 PM and 8 AM. By allowing the line subscriber to designate high tariff times, the line subscriber may receive compensation for times deemed valuable by the line subscriber.

According to another advantage of the present invention, the line subscriber may decide to return all or a portion of a tariff charged for access to a party at the line. Further, the line subscriber may accept a call where a tariff is payed to the line subscriber for meeting a certain condition, such as participating in a survey.

A billed transaction service 62 may be accessible within trusted telephone network 46, incorporated within an IP. Further, a billed transaction service 64 may be accessible outside trusted telephone network, incorporated within a telco application server or other external server. In addition, although not depicted, a billed transaction service may reside within destination device 44.

If a call is forwarded to destination device 44, an RVID is preferably determined for the individual answering a call. The RVID is then utilized to access an RVID profile 60, indicating additional selections for blocking calls and initiating billed transactions. Depending on the VID and context of a current call, the billed transaction service may be initiated in response to RVID profile 60.

Further, a callee at destination device 44 may view the VID and context of a call and determine whether to answer the call or to initiate a billed transaction service. The callee may initiate a billed transaction service by entering a code, such as A976@. RVID profile 60 may indicate the specific billed transaction service provider that the callee prefers to utilize from among billed transactions services 62 and 64.

For some calls, the caller may request to receive the identity of a callee before agreeing to pay a tariff for speaking with the callee. The RVID for the caller is then transferred to the caller with the prompting instruction to accept the tariff charge, decline, or request to negotiate.

For the billed transaction service to process a billed transaction, first, the caller and callee may be prompted to select from accounts identified in VID profile 56 and RVID profile 60. Then, depending on the type of tariff to be applied to billed transaction service establishes a connection with each of the account providers. For example, where a flat rate is agreed to for the callee answering the call, then a billed transaction is initiated to charge the caller account provider according to the caller VID, where the transaction is completed when the callee answers the call. In another example, where a periodic rate is agreed to, then a billed transaction is initiated to charge the caller account provider according to the caller VID, where caller account provider agrees to pay the fee calculated at the periodic rate at the completion of the call.

In particular, account providers may be located inside or outside trusted telephone network 46. In the present example, billed transaction service 62 negotiates between a caller account provider 66 and a callee account provider 68, both accessible via network 20 outside of trusted telephone network 46. In particular, billed transaction service 62 may transfer monetary amounts, points, electronic vouchers, electronic coupons and other tariff values agreed to by the parties. Advantageously, accounts managed by account providers may be accessible according to VID and RVID, such that account numbers need not be disclosed by the caller or callee for the billed transaction.

Figure 4:
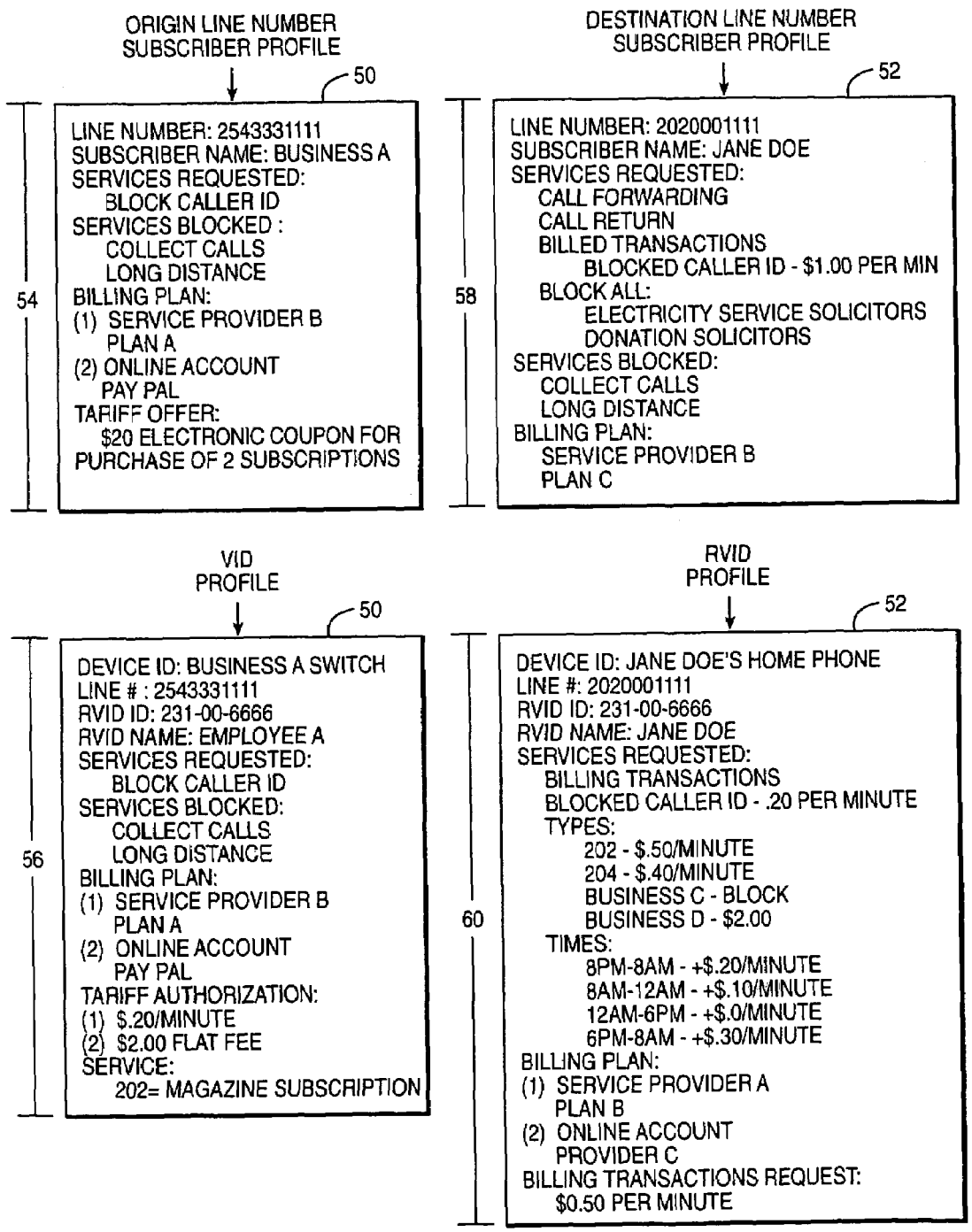
FIG. 4 illustrates an illustrative representation of the information within billing plans in accordance with the method, system, and program of the present invention.

Referring now to FIG. 4, there is an illustrative representation of the information within billing plans in accordance with the method, system, and program of the present invention.

In the example, an origin device line subscriber profile 54 is accessed and loaded into call register 50. Subscriber profile 54 may indicate billing plans for the line subscriber, services requested and blocked, and personal information about the line subscriber.

Advantageously, when a VID is determined for a caller, VID profile 56 is accessed and loaded into call register 50.

The caller may be the same as or different from the line subscriber. Even where the caller and the line subscriber are the same individual, the profile accessed for the caller VID may include information in addition to that stored for the line number.

In the example, the billing plan, tariff authorizations and context differ from that provided from subscriber profile 54. In particular, the line subscriber profile indicates that the line number is assigned to business A. The VID indicates the caller utilizing business A's switching system. The caller, employee A, has been granted tariff automatic authorization limits by business A. In addition, a description of the service provided by employee A is included in the VID profile. Here, employee A deals in magazine subscriptions. While in the present example, a business telephone and employee are described, in alternate embodiments, a self-employed business person or other independent entrepreneur may designate tariff authorization limits. Tariff authorization limits may be utilized by a billed transaction service as an automatic acceptance up to the limit for a tariff charged by a callee.

In addition, a VID or line subscriber profile may include a tariff offer. Advantageously, the callee is informed of the tariff offer upon receipt of the call. The billed transaction service may be initiated upon detection of a tariff offer, where the billed transaction service verifies the authenticity of the offer and determine a willingness to guarantee the offer. The callee may accept the offer, supplement the offer with an additional tariff requirement, or decline the offer.

Next a destination device line subscriber profile 58 is accessed and loaded into call register 52. Subscriber profile 58 may indicate billing plans for the line subscriber, services requested and blocked, and personal information about the line subscriber. In particular, a line subscriber may request to automatically initiate a billed transaction where a caller ID or VID is blocked with a call. In addition, a line subscriber may block all calls received from a particular line number or VID.

Although telemarketers are required by law to remove an individual's phone number from a calling list when requested by the individual, the individual will often still receive calls from the business for a period of time until the number is removed. Advantageously, after requesting to be removed, a callee may also enter a request to place the VID as a blocked call or charge the caller a large tariff for access to the line number for subsequent attempts.

Once a call has been answered, an RVID is determine for the callee, and RVID profile 60 accessed and loaded into call register 52. In the example, the callee is the same as the line subscriber, however in alternate embodiments, the callee and line subscriber may be different. In addition, the line subscriber may indicate a first set of preference to be attached to a particular line number and a second set of preferences that are loaded when the line subscriber is the callee answering a call at any phone.

In the example, RVID profile 60 requests a billed transaction service from a particular external server. Several conditions will initiate the billed transaction service including a blocked caller ID or VID, a VID that indicates a A202" or A204" type of service, a VID for ABusiness C@ or ABusiness D@ and calls received from 6PM to 12 AM. In addition, a RVID profile may include an address list of callers that should not initiate a billed transaction, even if received between 6PM and 12 AM.

According to one advantage of the present invention, a billed transaction service may initiate automatically where a destination line subscriber profile or RVID profile require. In addition, a callee may initiate a billed transaction service from the destination device. Further, an advantage of the present invention is allowing a callee to indicate the value of the callee's time and blocking a telephone line from being an instant portal to communication with a callee.

According to a further advantage of the present invention, a caller may pay to speak to a callee, a caller may pay for a callee to listen to an automated message, or a caller may pay for a callee to accept a particular product or service. Further, the caller may agree to pay a tariff if the callee agrees to purchase a product or service. Moreover, while payments have been described with reference to a monetary amount, payment may also include adding minutes to a wireless subscriber account or transferring electronic coupons that are redeemable for certain products and services. For example, a long distance service provider may pay a callee a voucher for 50 minutes if the callee is willing to accept the caller's call, where accepting the call further indicates an acceptance to change to the long distance service provider. Moreover, the callee may return a portion of a tariff if the callee decides to purchase a service or product.

According to another advantage of the present invention, where a caller may pay if the caller calls the wrong number and the callee has to transfer the caller to the right number. For example, where multiple lines are routed in a single home and one line is designated as the home line and the other as the children's line, callers who call the home line more than once when wanting to speak with the children may be charged a tariff, initiated by the callee, for transferring the caller to the children's line. The parent's profile may include VIDs of previous callers who have been transferred, such that the tariff is automatically applied on the next receipt of the VID where the RVID is a parent.

According to yet another advantage of the present invention, a callee profile may store the VIDs of callers and businesses who have solicited the callee, and who the callee has requested no longer solicit the callee. If a banned solicitor VID is detected for a call, the callee profile may request for the caller to be reminded that the callee has requested to be removed from the caller's list, however, the callee may also be willing to talk to the caller if the caller is willing to pay a rather large tariff. In addition, the callee may subscribe to a service that will automatically bill banned solicitors as a fine.

Figure 5A:
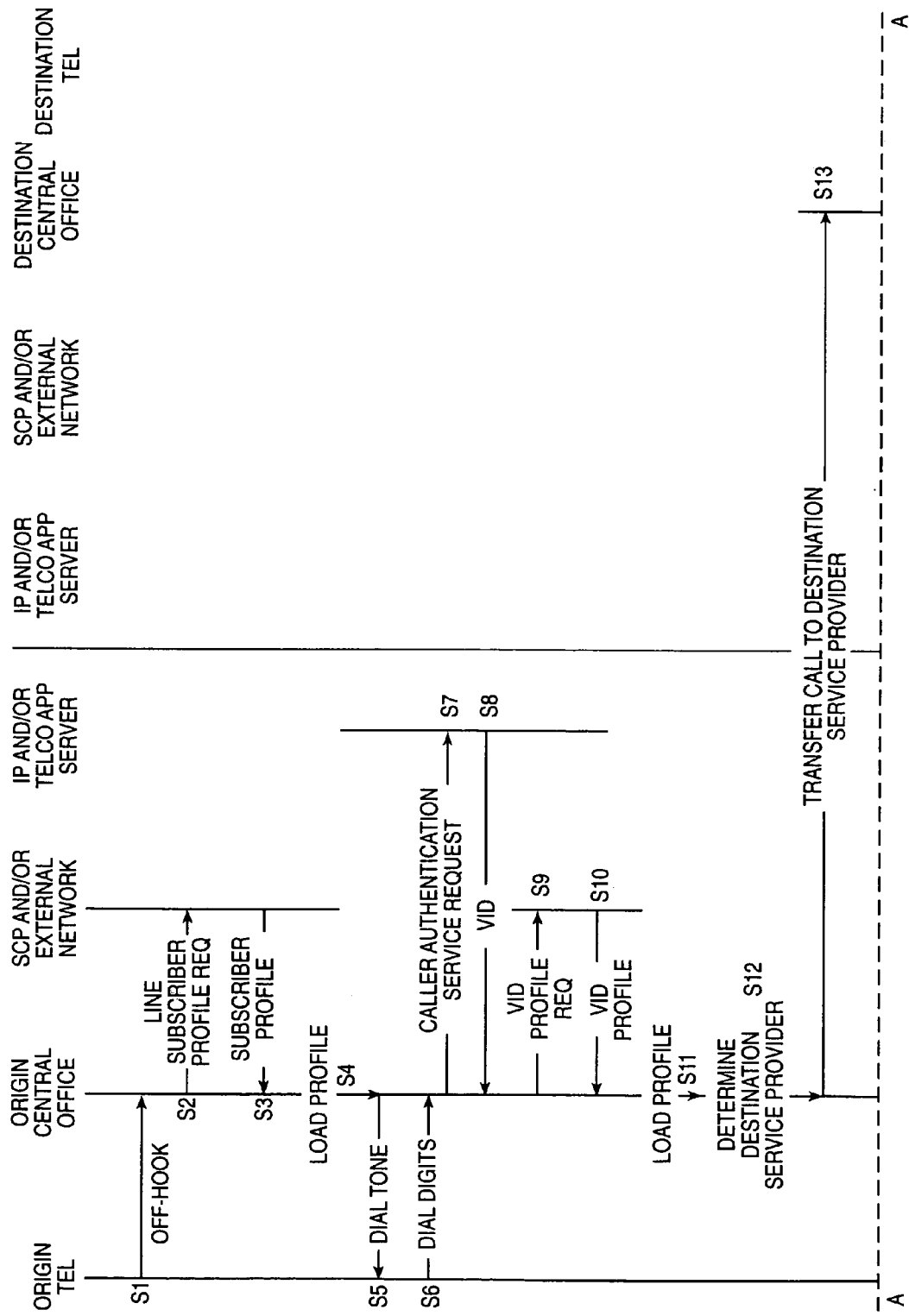
FIG. 5 depicts a flow diagram of a signal flow and processing of a call in accordance with the method, system, and program of the present invention.
Figure 5B:
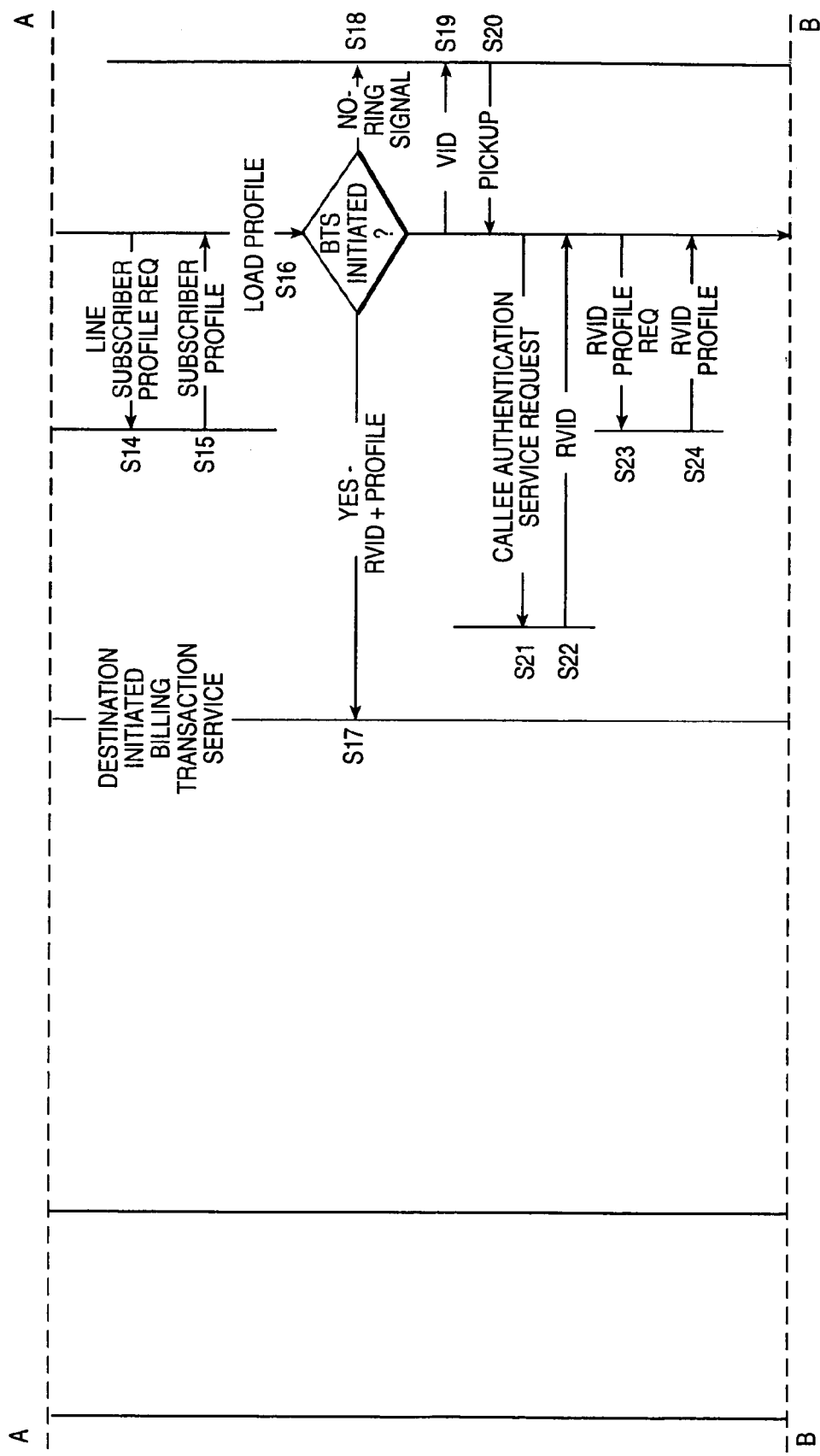
Figure 5C:
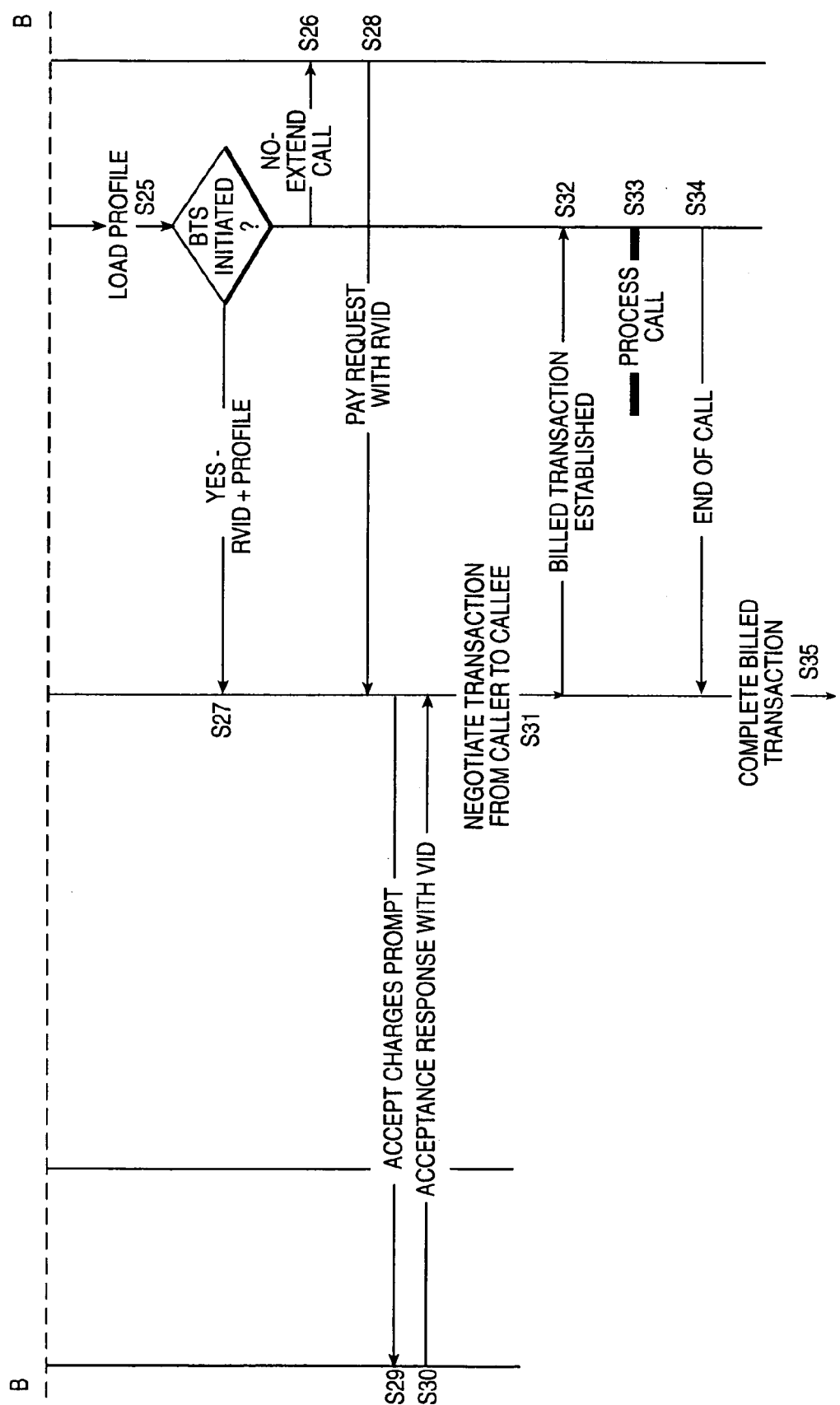

With reference now to FIG. 5, there is depicted a flow diagram of a signal flow and processing of a call in accordance with the method, system, and program of the present invention. A standard telephone device is assumed for the Atel@ origin device in the present example. However, a similar signal flow may be applied to other types of origin devices.

The caller lifts a handset creating an off-hook state in the origin device and a corresponding change in state of an off-hook signal to the origin central office (step S1). In response to detecting an off-hook state in the origin device, the origin central office establishes a register for the call and requests a line subscriber profile from the SCP and/or an external network server (step S2). A line subscriber profile including preferred services and a billing plan is returned to the origin central office (step S3). The central office loads the line subscriber profile into the call register (step S4) and extends a dial tone to the origin device (step S5).

The origin device then transmits dialed digits to the origin central office (step S6). A caller may utilize a keypad to enter a telephone number or utilize a voice dial feature if available. Dialed digits may be received at other points in the process and loaded into the call register until needed for processing the call.

Next, the origin central office extends a caller authentication service request to an IP or to the telco application server (step S7). The caller authentication server will prompt a caller to provide a voice utterance, match the voice utterance with a voice template and authenticate the caller identity as a VID which is returned to the central office (step S8). Alternatively, the origin device or destination device may perform caller authentication, where the VID is received from the origin device or destination device.

The origin central office updates the call register with the VID and extends a request for a VID based profile to the SCP and/or external network servers (step S9). The VID based profile is returned from locations where the caller has selected to make VID based information available (step S10). The origin central office then loads the VID based profile, including service preferences and billing information, into the call register (step S11). In particular, if a service provider indicated in a caller billing plan is different than the service provider providing the line, then the call may be transferred to the service provider indicated in the caller billing plan, where a new call register is created in the central office of the caller billing service provider.

Next, the origin central office determines the service provider for the destination line number (step S12). The destination line number service provider may be different or the same as the origin line number service provider. The call is transferred to the central office of the destination service provider (step S13).

The destination central office establishes a call register for the call and triggers a request to the SCP or an external network server for a line subscriber profile for the destination line number (step S14). The line subscriber profile is returned, including billing information and service preferences (step S15). The destination central office loads the destination line subscriber profile into the call register (step S16) and determines whether the VID, including call context, require initiating a billed transaction service according to the billed transaction preferences selected in the line subscriber profile. If a billed transaction service initiation is not required, then a ring signal is extended to the destination device (step S18). If a billed transaction service initiation is required, then the line subscriber identification and profile are preferably transferred to a billed transaction service selected within the profile (step S17). In particular, the process may proceed to step S29 following the billed transaction service initiation.

In response to detecting a pickup of the destination device, an off-hook pickup signal is returned from the destination device to the destination central office (step S20). Next, the destination central office extends a callee authentication service request to an IP or to the telco application server (step S21). The callee authentication server will prompt a callee to provide a voice utterance, match the voice utterance with a voice template and authenticate the callee identity as a RVID which is returned to the destination central office (step S22). Alternatively, the origin device or destination device may perform caller authentication, where the RVID is received at the destination central office from the origin device or destination device.

The destination central office updates the call register with the RVID and extends a request for a RVID based profile to the SCP and/or external network servers (step S23). The RVID based profile is returned from locations where the caller has selected to make RVID based information available (step S24). The destination central office then loads the RVID based profile, including service preferences and billing information, into the call register (step S25).

Next, a determination is made as to whether the VID, including call context, require initiating a billed transaction service according to the billed transaction preferences selected in the RVID profile. If a billed transaction service initiation is not required, then the call, including the VID for the caller, is extended to the destination device (step S26). If a billed transaction service initiation is required, then the RVID and RVID profile are preferably transferred to a billed transaction service selected within the RVID profile (step S27). In particular, the process may proceed to step S29 following the billed transaction service initiation.

The callee has the opportunity to enter digits that will request initiation of a billed transaction service for the call. For example, a billed transaction service request and rate may be entered at and transferred from the destination device (step S28). The process may proceed to step S29 following the billed transaction service initiation.

In response to a billed transaction service initiation, the transaction service preferably determines the rate that a caller will be charged according to profiles or callee input. The caller is prompted to accept the tariff charges (step S29). The prompt may also indicate the line subscriber requesting the tariff charges, the callee accepting the call, and other information that will aid the caller in determining whether or not to pay a tariff to speak to the callee. The caller may respond with an acceptance according to the caller VID (step S30). In addition, the caller may elect an account to be debited for the tariff charge.

The billed transaction service then negotiates the transaction from the caller to the callee by contacting the account providers for each party and receiving verification of accounts (step S31). The billed transaction service then sends an indicator to the destination central office that the billed transaction has been established (step S32). In particular, the billed transaction service may require a deposit by a caller account provider or the billed transaction service may have a trusted relationship with the caller account provider, wherein the caller account provider is trusted to pay after the call and the billed transaction service insures the payment.

The destination central office will process the call between the caller and the callee (step S33). When the call has ended, the central office transfers an end of call signal to the billed transaction service (step S34) and the billed transaction service completes the billed transaction (step S35).

Figure 6:
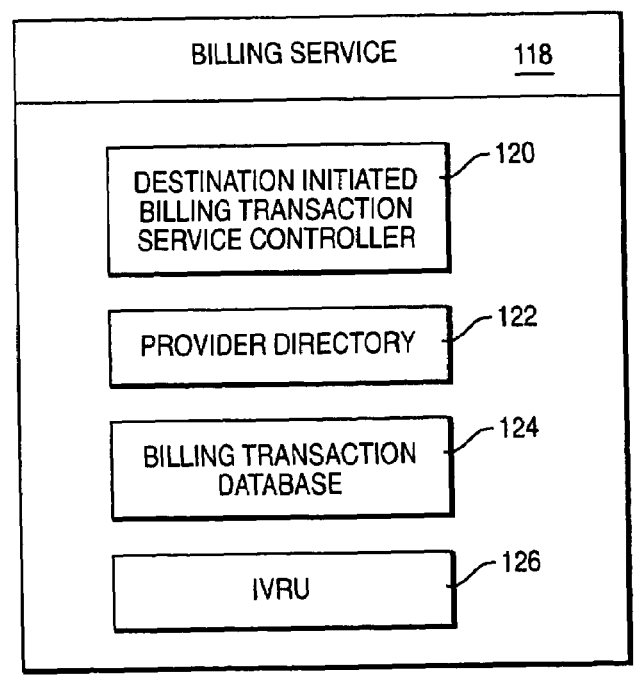
FIG. 6 illustrates a block diagram of a billing service in accordance with the method, system, and program of the present invention.

Referring now to FIG. 6, there is depicted a block diagram of a billing service in accordance with the method, system, and program of the present invention. As illustrated, a billing service 118 includes an destination initiated billing transaction service controller 120. Controller 120 preferably facilitates creating a destination initiated billing request, prompting the caller with the billing request, and facilitating payment of the billing transaction from the caller to the callee.

A provider directory 122 preferably includes network addresses of account and service providers to enable controller 120 to facilitate billing to account and service providers. In addition, provider directory 122 may include ratings for account and service providers according to reliability in previous financial transactions.

A billing transaction database 124 preferably records origin initiated billing transactions facilitated by controller 120. The payment number, payment providers, payment destination and other information related to the transaction may be stored. In particular, records may be stored according to VID or RVID for reference in future transactions.

An interactive voice response unit 126 may prompt the callee to create a billed transaction and may prompt the caller to accept a billed transaction. In addition or alternatively, text messaging may be utilized, where text messages are displayable at the origin and destination device. Further, prompting may be provided in the form of a selectable form in HTML or other network supported languages, transmitted to the origin or destination device.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for billing for a call, said method comprising:
    responsive to detecting a call originated by a caller to a destination line, accessing a caller profile for said caller, wherein said caller profile specifies a limit for automatic acceptance of a tariff payment request for said call;
    responsive to detecting a callee answer said call at said destination line, accessing a callee profile for said callee, wherein said callee profile designates a first cost for access to said callee during a current time period and a second cast for access by said caller to said callee;
    initiating a request to bill said caller a tariff for said call, wherein said tariff is calculated from said first cost and said second cost in said callee profile;
    responsive to said caller limit for automatic acceptance exceeding or matching said tariff, automatically initiating negotiation of payment of said tariff;
    responsive to said tariff exceeding said limit for automatic acceptance, prompting said caller to accept payment of said tariff to initiate negotiation of payment of said tariff to receive access to a destination line during said call; and
    responsive to negotiating said payment of said tariff from a caller account provided specified in said caller profile to a callee account provider specified in said callee profile, connecting said caller with said destination line, such that said caller pays for access to said destination line.

2. The method for billing for a call according to claim 1, further comprising:
    authenticating an actual identity of a callee answering a call at said destination line;
    prompting said caller to accept payment of said tariff to communicate with said callee identified by said authenticated actual identity, wherein said caller is able to determine prior to accepting payment of said tariff with whom said caller is paying to communicate.

3. The method for billing for a call according to claim 1, further comprising:
    authenticating an actual identity of said caller; and
    loading a billing profile for said authenticated actual identity of said caller, wherein said billing profile specifies an account from which said payment of said tariff is to be negotiated.

4. The method for billing for a call according to claim 1, wherein said request to bill a caller is initiated in response to a tariff offer in a caller profile.

5. The method for billing for a call according to claim 1, wherein said request to bill a caller is received in response to a requirement in a line subscriber profile for said destination line.

6. The method for billing for a call according to claim 1, wherein said request to bill a caller is received in response to a requirement in a callee profile for a callee answering said call at said destination line.

7. The method for billing for a call according to claim 1, wherein said request to bill a caller is received in response to an entry by a callee answering said call at said destination line.

8. The method for billing for a call according to claim 1, wherein said tariff comprises at least one from among a monetary amount, a point amount, an electronic voucher, and an electronic coupon.

9. The method for billing for a call according to claim 1, further comprising:
    negotiating payment of said tariff from a caller account provider.

10. The method for billing for a call according to claim 9, wherein said caller account provider is accessible within a trusted telephone network.

11. The method for billing for a call according to claim 9, wherein said caller account provider is accessible outside a trusted telephone network.

12. The method for billing for a call according to claim 9, wherein said caller account provider is accessed according to an authenticated identity of said caller.

13. The method for billing for a call according to claim 1, further comprising:
    only completing payment of said tariff if said callee performs to meet at least one condition of said tariff in addition to answering said call.

14. The method for billing for a call according to claim 1, further comprising:
    initating said request to bill said caller said tariff, responsive to said callee entering a command to forward said call to an alternate destination device.

15. The method for billing for a call according to claim 1, further comprising:
    refunding at least a portion of said tariff to said caller.

16. A system for billing for a call, said system comprising:
    a billing controller communicatively connected to a trusted telephone network;
    means, responsive to detecting a call via said trusted telephone network originated by a caller to a destination line, for said billing controlleraccessing a caller profile for said caller, wherein said caller profile specifies a limit for automatic acceptance of a tariff payment request for said call;

means, responsive to detecting a callee answer said call at said destination line, for said billing controller accessing a callee profile for said callee, wherein said callee profile designates a first cost for access to said callee during a current time period and a second cost for access by said caller to said callee;

means for initiating a request for said billing controller to bill said caller a tariff for said call, wherein said tariff is calculated from said first cost and said second cost in said callee profile;

said billing controller for automatically initiating negotiation of payment of said tariff responsive to said caller limit for automatic acceptance exceeding or matching said tariff;

said billing controller for prompting said caller to accept payment of said tariff to initiate negotiation of payment of said tariff to receive access to a destination line during said call, responsive to said tariff exceeding said limit for automatic acceptance; and means responsive to said billing controller negotiating said payment of said tariff from a caller account provided specified in said caller profile to a callee account provider specified in said callee profile, for connecting said caller with said destination line.

17. The system for billing for a call according to claim 16, said billing controller further comprising:
means for authenticating an actual identity of a callee answering a call at said destination line; and
means for prompting said caller to accent payment of said tariff to communicate with said callee identified by said authenticated actual identity, wherein said caller is able to determine prior to accepting payment of said tariff with whom said caller is paying to communicate.

18. The system for billing for a call according to claim 16, said billing controller further comprising:
means for authenticating an actual identity of said caller; and
means for loading a billing profile for said authenticated actual identity of said caller, wherein said billing profile specifies an account from which said payment of said tariff is to be negotiated.

19. The system for billing for a call according to claim 16, wherein said request to bill a caller is initiated in response to a tariff offer in a caller profile.

20. The system for billing for a call according to claim 16, wherein said request to bill a caller is received in response to a requirement in a line subscriber profile for said destination line.

21. The system for billing for a call according to claim 16, wherein said request to bill a caller is received in response to a requirement in a callee profile for a callee answering said call at said destination line.

22. The system for billing for a call according to claim 16, wherein said request to bill a caller is received in response to an entry by a callee answering said call at said destination line.

23. The system for billing for a call according to claim 16, wherein said tariff comprises at least one from among a monetary amount, a point amount, an electronic voucher, and an electronic coupon.

24. The system for billing for a call according to claim 16, said billing controller further comprising:
means for negotiating payment of said tariff from a caller account provider.

25. The system for billing for a call according to claim 9, wherein said caller account provider is accessible within said trusted telephone network.

26. The system for billing for a call according to claim 9, wherein said caller account provider is accessible outside said trusted telephone network.

27. The system for billing for a call according to claim 9, wherein said caller account provider is accessed according to an authenticated identity of said caller.

28. The system for billing for a call according to claim 16, said billing controller further comprising:
means for only completing payment of said tariff if said callee performs to meet at least one condition of said tariff in addition to answering said call.

29. The system for billing for a call according to claim 16, said billing controller further comprising:
means for initiating said request to bill said caller said tariff, responsive to said callee entering a command to forward said call to an alternate destination device.

30. The system for billing for a call according to claim 16, said billing controller further comprising:
means for refunding at least a portion of said tariff to said caller.

31. A computer program product for billing for a call, said computer program product comprising:
a recording medium;
means, recorded on said recording medium, for accessing a caller profile for a caller, responsive to detecting a call originated by said caller to a destination line, wherein said caller profile specifies a limit for automatic acceptance of a tariff payment request for said call;
means, recorded on said recording medium, for accessing a callee profile for a callee, responsive to detecting said callee answer said call at said destination line, wherein said callee profile designates a first cost for access to said callee during a current time period and a second cost for access by said caller to said callee;
means, recorded on said recording medium, for initiating a request to bill said caller a tariff for said call, wherein said tariff is calculated from said first cost and said second cost in said callee profile;
means, recorded on said recording medium, for automatically initiating negotiation of payment of said tariff, responsive to said caller limit for automatic acceptance exceeding or matching said tariff;
means, recorded on said recording medium, for prompting said caller to accept payment of said tariff to initiate negotiation of payment of said tariff to receive access to a destination line during said call, responsive to said tariff exceeding said limit for automatic acceptance; and
means, recorded on said recording medium, connecting said caller with said destination line, such that said caller pays for access to said destination line responsive to negotiating said payment of said tariff from a caller account provided specified in said caller profile to a callee account provider specified in said callee profile.

32. The computer program product for billing for a call according to claim 31, further comprising:
means, recorded on said recording medium, for authenticating an actual identity of a callee answering a call at said destination line; and
means, recorded on said recording medium, for prompting said caller to accept payment of said tariff to communicate with said callee identified by said authenticated actual identity, wherein said caller is able to determine prior to accepting payment of said tariff with whom said caller is paying to communicate.

33. The computer program product for billing for a call according to claim 31, further comprising:
   means, recorded on said recording medium, for authenticating an actual identity of said caller; and
   means, recorded on said recording medium, for loading a billing profile for said authenticated actual identity of said caller, wherein said billing profile specifies an account from which said payment of said tariff is to be negotiated.

34. The computer program product for billing far a call according to claim 31, further comprising:
   means, recorded on said recording medium, for negotiating payment of said tariff from a caller account provider.

35. The computer program product for billing for a call according to claim 31, further comprising:
   means, recorded on said recording medium, for only completing payment of said tariff if said callee performs to meet at least one condition of said tariff in addition to answering said call.

36. The computer program product for billing for a call according to claim 31, further comprising:
   means, recorded on said recording medium, for initiating said request to bill said caller said tariff, responsive to said callee entering a command to forward said call to an alternate destination device.

37. The computer program product for billing for a call according to claim 31, further comprising:
   means, recorded on said recording medium, for refunding at least a portion of said tariff to said caller.

* * * * *

UNITED STATES PATENT AND TRADEMARK OFFICE
CERTIFICATE OF CORRECTION

| | |
|---|---|
| PATENT NO. | : 6,996,216 B2 |
| APPLICATION NO. | : 10/022159 |
| DATED | : February 7, 2006 |
| INVENTOR(S) | : Michael Wayne Brown et al. |

It is certified that error appears in the above-identified patent and that said Letters Patent is hereby corrected as shown below:

Please Insert
Item [56] Under Foreign Patent Documents, "JP 0676882 A2" should read --EP 0676882 A2--.
In Claim 1, Col. 19, line 46, "cast" should read --cost--.
In Claim 17, Col. 21, line 29, "accent" should read --accept--.
In Claim 34, Col. 23, line 10, "far" should read --for--.

Signed and Sealed this

Twelfth Day of December, 2006

JON W. DUDAS
*Director of the United States Patent and Trademark Office*